A. J. SCHUBERT.
TWO-SPEED FINAL DRIVE GEAR SET FOR MOTOR VEHICLES.
APPLICATION FILED AUG. 29, 1919.

1,407,226.

Patented Feb. 21, 1922.

A. J. Schubert
Inventor

By Lancaster and Allwine
Attorneys

UNITED STATES PATENT OFFICE.

ANTHONY J. SCHUBERT, OF RAYMOND, KANSAS.

TWO-SPEED FINAL-DRIVE GEAR SET FOR MOTOR VEHICLES.

1,407,226.  Specification of Letters Patent.  Patented Feb. 21, 1922.

Application filed August 29, 1919. Serial No. 320,621.

*To all whom it may concern:*

Be it known that I, ANTHONY J. SCHUBERT, a citizen of the United States, residing at Raymond, in the county of Rice and State of Kansas, have invented certain new and useful Improvements in Two-Speed Final-Drive Gear Sets for Motor Vehicles, of which the following is a specification.

This invention relates to speed changing gear sets for motor vehicles, and more particularly to a two speed final gear set, by means of which the ratio of the speed transmission between the engine and the rear axle, may be varied, at the final gear set of a motor vehicle.

In the present construction of automobiles, or analogous motor vehicles, a single speed final drive gear set is provided, and consequently only one speed of transmission through this final gear set is permitted, which does not give wide enough range of speed, and the ordinary final gear set also causes unnecessary strain on the engine at high speed. The final drive gear set, of approved type used in practically all automobiles or motor vehicles of approved type has but one speed and direct drive, and consequently it is necessary to have the gear ratio low enough to permit the transmission of ample power to the rear drive wheels to climb any hills which might be encountered, and if the gear ratio is low enough to provide this ample power for all road conditions, it is too low for the majority of road conditions. For instance, in touring, cross country, a road may have a portion of its length thereof sandy and heavy to pull, for a considerable length and on such roads a low gear ratio in the final drive gear set is needed to permit the transmission of the proper power to the drive wheels of the automobile, and by travelling over the same road, perfectly smooth, hard and flat surface may be encountered which is also of considerable extent, and on such roads, the higher gear ratio in the final gear set would be desirable, as by such a construction, the speed of travel of the vehicle could be increased without increasing the engine speed to any material extent, thereby resulting in a saving of gasoline and increasing the longevity of the engine. It is an object of this invention to provide a final drive gear set for automobiles or motor vehicles, which includes a plurality of speed changes to permit adjustment of the ratio of the transmission of speed from the engine to the drive axle of the vehicle without variation of the speed of the engine.

Other objects of the invention will appear in the following detailed description taken in connection with the accompanying drawings, forming a part of this specification and in which drawings:

Figure 5 is an enlarged detail of a part of the shifting mechanism of the gear set.

Figure 1:
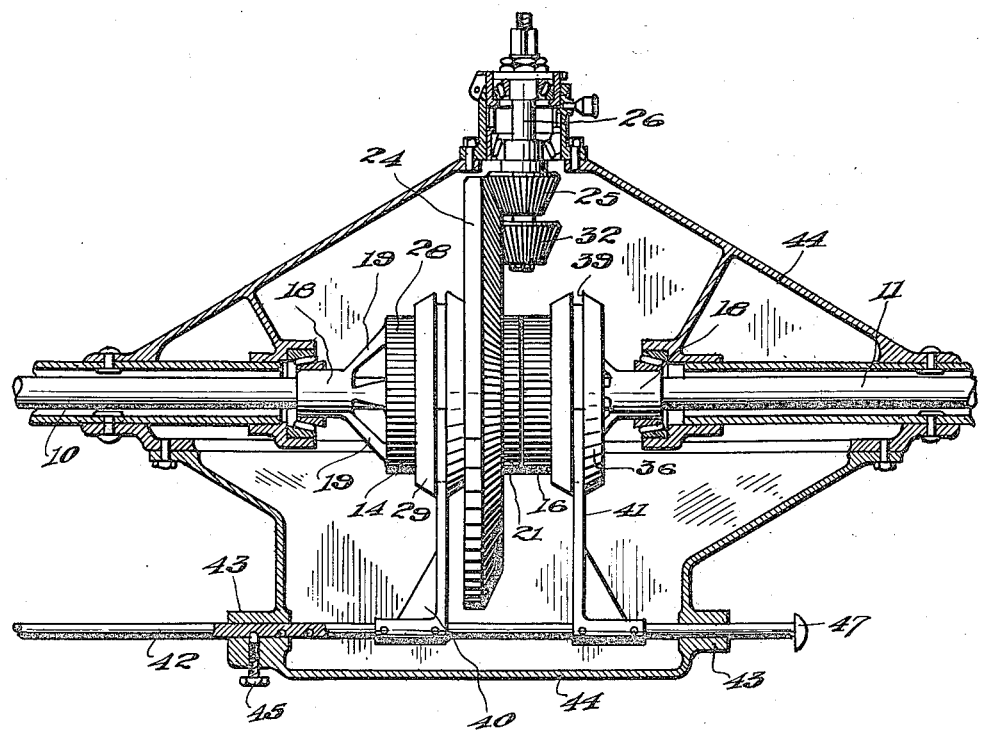
Figure 1 is a top plan of the improved final gear set.
Figure 2:
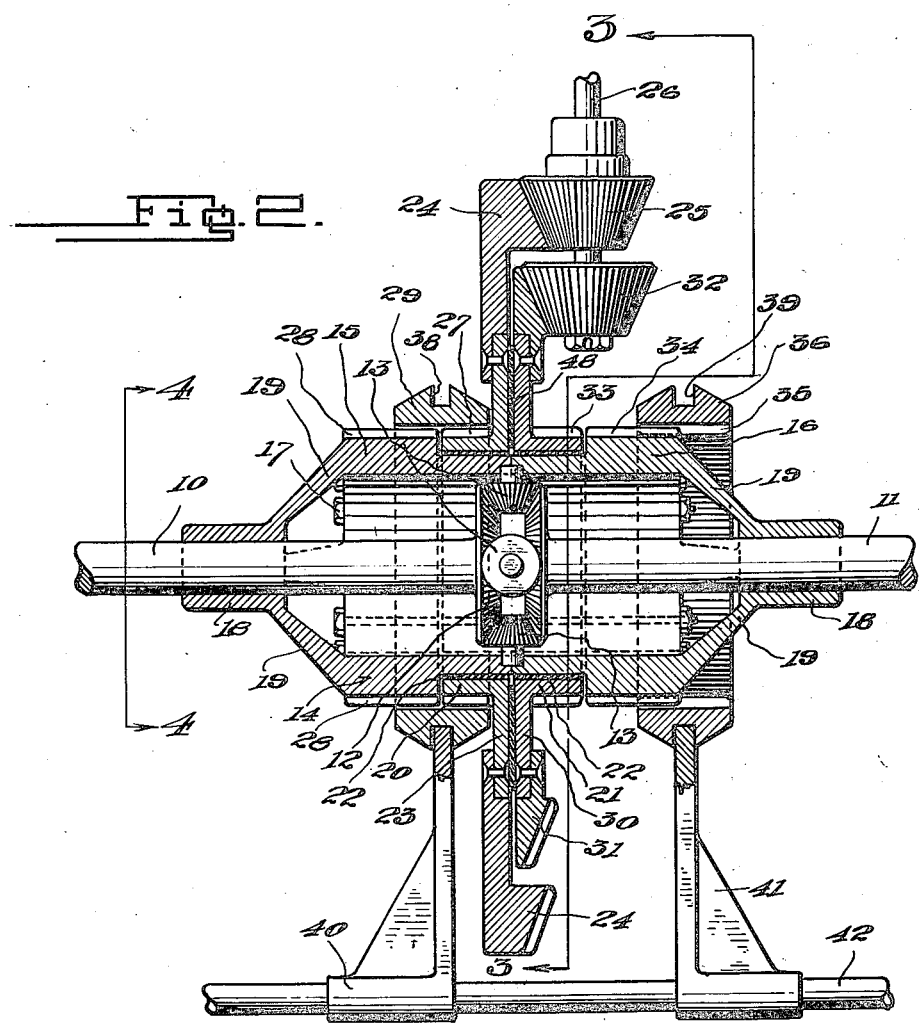
Figure 2 is a section through the gear set.
Figure 3:
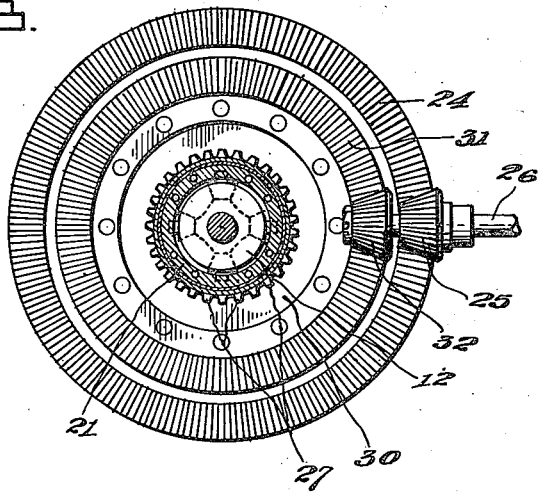
Figure 3 is a section taken on the line 3—3 of Figure 2.
Figure 4:
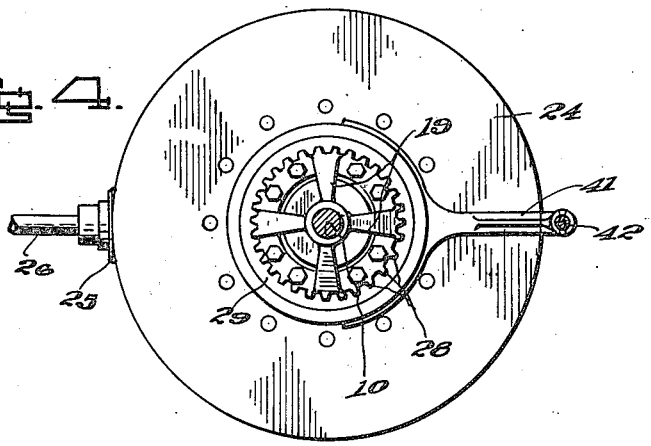
Figure 4 is an end elevation of the gear set taken on the line 4—4 of Figure 2.

Referring more particularly to the drawings, wherein like characters indicate like and corresponding parts throughout the several views, the axle sections 10 and 11 of the rear axle structure of any approved type of motor vehicles are connected through the medium of the usual type of differential gears 12 and the driving pinions 13 of these differential gears, are carried by a sleeve structure 14, which is composed of sections 15 and 16 that are connected by bolts 17. Each of the sections 15 and 16 has a bearing 18 upon its outer end, connected to the outer end of the section by suitable diagonal arms 19, and these bearings 18 receive therethrough the axle sections 10 and 11.

The sections 15 and 16 have their facing ends reduced in diameter, and collars 20 and 21 are rotatably mounted upon the reduced portions of the sleeves 15 and 16 respectively, suitable wear sleeves 22 being positioned between the wearing surfaces of the collars and the sleeve sections. The collar 20 has an annular transversely extending flange 23 formed thereon to the outer edge of which is attached a bevelled gear 24. This bevelled gear 24 meshes with a pinion 25, which has connection with the engine or motor of a motor vehicle through the shaft 26. The collar 20 is mounted upon the sleeve section 15 for independent rotary movement and it has a plurality of gear teeth 27 upon its periphery, corresponding to gear teeth 28 formed about the sleeve 15. An internal or crown gear 29 is slidably carried by the sleeve section 15 and collar 20 and the teeth thereof are adapted to mesh with the teeth 27 and 28 for connecting the sleeve 15 to the collar 20 for rotating the sleeve by this collar and consequently by rotation of the bevelled gear 24, and the rotation of the sleeve 14, by this bevelled gear 24 will transmit motion, through the differential gear structure 12 to the axle sections 10 and 11 in the usual manner, rotating them at a low ratio of speed with respect to the speed of rotation of the shaft 26.

The collar 21, has an annular outwardly extending flange 30 formed thereon to the periphery or outer edge of which is attached a bevelled gear 31, being of smaller diameter than the bevelled gear 24. This bevelled gear 31 meshes with the bevelled pinion 32 carried by the shaft 26, and thus operative connection with the engine or prime mover of the vehicle is established, through the shaft 26 and beveled pinion 32 for rotating the bevelled gear 31. The collar 21 has gear teeth 33 upon its periphery which correspond to teeth 34 upon the outer surface or periphery of the sleeve section 16, and which are adapted to permit the establishing of connection with the sleeve section, through the medium of the internal gear teeth 35 of the crown or internal gear 36, which is slidably carried by the sleeve section 16, for movement to establish driving connection between the collar 21 and the sleeve 14, to drive the sleeve and consequently the axle sections 10 and 11 at a high ratio of speed with respect to the speed of rotation of the shaft 26.

The internal gears 29 and 36 are provided with annular channels 38 and 39, respectively, centrally of their peripheries, in which channels shifting members 40 and 41, respectively engage. The shifting members 40 and 41 are attached to a shifting rod 42, which is slidably supported by suitable bearings 43, formed upon the gear housings 44. The rod 42 may be shifted by any suitable means, for shifting the crown or internal gears 29 and 36 to regulate the speed of operation of the sleeve structure 14, and a spring controlled latch structure 45 is provided which is adapted for engagement in the structure 46 formed in the shifting bar 42 to hold the shifting bar or rod against accidental movement. A head 47 is preferably formed upon one end of the shifting rod to limit the shifting movement thereof.

In operation; when it is desired to rotate the axle sections 10 and 11 at a low ratio of speed with respect to the speed of rotation of the shaft 26, the rod 42 is shifted, to slide the crown gear 29, so that the internal teeth thereof will mesh with the teeth of the collar 20 and also the corresponding teeth upon the sleeve section 15, thereby connecting these members for positive rotation. The connection will consequently rotate the sleeve 14, by the rotation of the gear 24, and establish a low ratio of speed of rotation of the axle and the shaft 26, while if it is desired to rotate the axle sections at a relatively high rate of speed with respect to the shaft 26, the rod 42 is shifted for moving the crown gear 29 out of engagement with the teeth 27 of the collar 20 and to shift the crown gear 36, into meshing engagement with the teeth 33 of the collar 21 and also into engagement with the teeth 34 thereby establishing operative communication between the collar 21 and the sleeve section 16 for rotating the sleeve 14 by rotation of the relatively small bevelled gear 31.

A wear collar or disc 48 is positioned between the facing surfaces of the annular flanges 23 and 30 to prevent the wear one upon the other during their rotation.

Changes in details may be made without departing from the spirit of this invention, but;

I claim:

1. In a gear set for motor vehicles, the combination with a drive axle structure including differential gears, of a sleeve connected to said differential gears for operating them, said sleeve including an annular recessed portion, and a hub portion having gear teeth thereon, a plurality of driving gears rotatably carried by said sleeve in said annular recess, said gears having toothed hubs thereon lying flush with the teeth upon said sleeve, and slidable means for selectively engaging said sleeve and a particular driving gear for operation of the gear set.

2. In a gear set for motor vehicles, the combination with a drive axle structure including differential gears, of a pair of sleeves connected together centrally thereof to support said differential gears, said sleeves including an annular recessed portion upon the abutting ends thereof, and toothed hubs, a plurality of drive gears rotatably mounted in the annular recesses provided by said sleeves, each of said drive gears having a toothed hub integral therewith lying flush with the toothed hub of a respective sleeve section, and slidable means for selectively engaging a particular sleeve and a particular drive gear for operation of the gear set.

3. In a gear set for motor vehicles, the combination of a pair of driven shaft sections, a sleeve comprising a pair of sections, differential means in said sleeve for connecting said shaft sections thereto, means for detachably connecting said sleeve sections, drive gears, said sleeve section connecting means adapted to rotatably support said drive gears on said sleeve, and means for effectively connecting said sleeve and drive gears.

4. In a gear set for motor vehicles, the combination of a pair of drive shaft sections, a sleeve comprising a pair of sections, each of said sleeve sections having an annular reduced portion thereon, differential means connecting the meeting ends of said shaft section, clamp means for detachably connecting said sleeve sections to support said differential means, and to provide an annular recess in said sleeve by abutment of the reduced portions of the sleeve sections, drive gears detachably carried by said sleeve within the annular recess, and means for selectively connecting said sleeve and drive gears.

ANTHONY J. SCHUBERT.